(12) United States Patent
Eckhardt et al.

(10) Patent No.: US 11,359,888 B1
(45) Date of Patent: Jun. 14, 2022

(54) IMAGING WHILE SIMULTANEOUSLY DETECTING, TRACKING AND DECODING MULTIPLE CODED LASER SPOTS

(71) Applicant: Sensors Unlimited, Inc., Princeton, NJ (US)

(72) Inventors: Andrew Eckhardt, Richboro, PA (US); Mark Aguilar-Aasted, Monroe Township, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 17/315,157

(22) Filed: May 7, 2021

(51) Int. Cl.
*G06T 7/30* (2017.01)
*F41G 7/22* (2006.01)
*G01J 1/42* (2006.01)

(52) U.S. Cl.
CPC ........... *F41G 7/226* (2013.01); *F41G 7/2293* (2013.01); *G01J 1/42* (2013.01); *G01J 2001/4238* (2013.01)

(58) Field of Classification Search
CPC .... G06T 7/30; G06T 7/32; G06T 7/38; G06T 9/00; G06T 2201/00; H03K 7/00; H03K 7/02; H03K 7/04; H03K 7/08; H03K 11/00; H01S 5/0621; G01J 11/00; G01S 13/04; G01S 13/06; G01S 17/06
USPC .......................................... 250/208.1, 214 R
See application file for complete search history.

(56) References Cited

U.S. PATENT DOCUMENTS

| | | | |
|---|---|---|---|
| 8,816,268 B1 * | 8/2014 | Stobie | H04N 5/378 250/214 A |
| 9,494,687 B2 | 11/2016 | Ell et al. | |
| 9,897,688 B2 | 2/2018 | Choiniere et al. | |
| 10,077,972 B1 | 9/2018 | Choiniere et al. | |
| 10,126,101 B2 | 11/2018 | Ell | |
| 10,203,414 B2 | 2/2019 | Nazemi et al. | |
| 10,218,921 B2 | 2/2019 | Neal et al. | |
| 10,267,902 B2 | 4/2019 | Liobe et al. | |

* cited by examiner

*Primary Examiner* — Que Tan Le
(74) *Attorney, Agent, or Firm* — Locke Lord LLP; Joshua L. Jones; Gabrielle L. Gelozin

(57) ABSTRACT

A system comprises a photodetector array (PDA) including a plurality of imaging pixels configured to generate electrical signals indicative of an imaged scene, and an integrated circuit (IC) operatively connected to the PDA to receive the electrical signals from the imaging pixels to form image data.

20 Claims, 2 Drawing Sheets

IMAGING WHILE SIMULTANEOUSLY DETECTING, TRACKING AND DECODING MULTIPLE CODED LASER SPOTS

BACKGROUND

1. Field

The present disclosure relates generally to targeting systems, and more particularly to systems for targeting using laser designators with Pulse Interval Modulation (PIM).

2. Description of Related Art

Traditional laser seekers use quad cell technology which uses four photo detector cells arranged with optics such that each cell responds only to received laser pulses within one of the four quadrants. Since there are only a few detector cells these systems are not able to easily distinguish between multiple targets in the field of view. Additionally, these quad cell systems may be designed to operate only at a specific laser frequency.

The conventional techniques have been considered satisfactory for their intended purpose. However, there is an ever present need for improved systems and methods for tracking. This disclosure provides a solution for this need.

SUMMARY

A system comprises a photodetector array (PDA) including a plurality of imaging pixels configured to generate electrical signals indicative of an imaged scene, and an integrated circuit (IC) operatively connected to the PDA to receive the electrical signals from the imaging pixels to form image data. In embodiments, the PDA is sensitive to SWIR wavelengths. In certain embodiments, the IC is or includes a read out only integrated circuit (ROIC) and/or a field programmable gate array (FPGA).

In certain embodiments, the IC includes machine readable instructions configured to cause the IC to detect one or more Pulse Interval Modulated (PIM) coded laser pulses in the image data and correlate position and timing of the one or more PIM coded laser pulses to features in the image data. The one or more features in the image data can be indicative of a designated target In embodiments, the machine readable instructions are further configured to cause the IC to detect one or more Pulse Repetition Frequency (PRF) coded laser pulses in the image data, in addition to detecting the one or more PIM coded laser pulses. In embodiments, detecting one or more PIM coded laser pulses includes receiving a pseudo-random pulse pattern.

In certain embodiments, detecting one or more PIM coded laser pulses includes detecting multiple separate laser designated targets, each having a distinct PIM code. In certain such embodiments, correlating position and timing of the one or more PIM coded laser pulses to features in the image data indicative of a designated target includes correlating each PIM code to a separate target indicated in the features of the image data.

In certain embodiments, an artificial intelligence platform can be operatively connected to the IC to classify the designated target and/or determine the PIM code. In embodiments, the machine readable instructions are further configured to cause the IC to use the PIM code to guide a munition to the classified designated target. In certain such embodiments, the guided munition can include at least one control surface operatively connected to a controller, the controller operatively connected to the IC to guide the guided munition the classified designated target. The controller is configured to specify a region of interest (ROI) in the image data surrounding the designated target, and to ignore laser pulses outside the ROI.

In embodiments, the machine readable instructions can be further configured to cause the IC to receive PRF spoofing pulses in the image data and disregard the PRF spoofing pulses while continuing to correlate the one or more PIM coded laser pulses.

A method includes forming an image on a photodetector array (PDA), receiving electrical signals from the PDA into an integrated circuit (IC) and converting the electrical signals into image data. The method includes detecting, with a laser pulse detector operatively connected to the IC, one or more Pulse Interval Modulated (PIM) coded laser pulses in the image data, and correlating the one or more PIM coded laser pulses with one or more features in the image data.

In embodiments, the method can further include detecting, with the laser pulse detector operatively connected to the IC, one or more Pulse Repetition Frequency (PRF) coded laser pulses in the image data, in addition to detecting the one or more PIM coded laser pulses.

Detecting one or more PIM coded laser pulses can include detecting multiple separate laser designated targets, each having a distinct PIM code. In certain embodiments, detecting the one or more PIM coded laser pulses further includes receiving a pseudo-random pulse pattern.

In embodiments, the method can further include classifying the designated target using an artificial intelligence platform operatively connected to the IC. In certain such embodiments, the method can include guiding a munition to the classified designated target using the PIM code detected by the IC.

In embodiments, the method further includes specifying a region of interest (ROI) in the image data surrounding the designated target, and ignoring laser pulses outside the ROI. In certain embodiments, the method includes receiving PRF spoofing pulses in the image data, and disregarding the PRF spoofing pulses while continuing to correlate the one or more PIM coded laser pulses.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
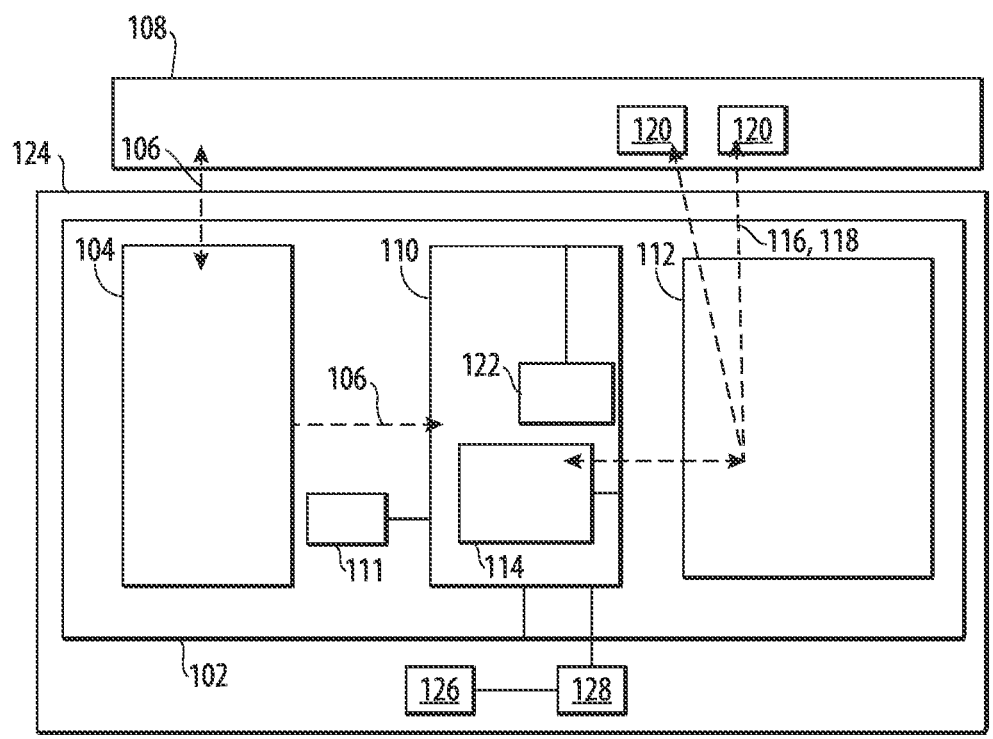
FIG. 1 is a schematic diagram of an embodiment of a an imaging system constructed in accordance with the present disclosure, showing a photodetector array.
Figure 2:
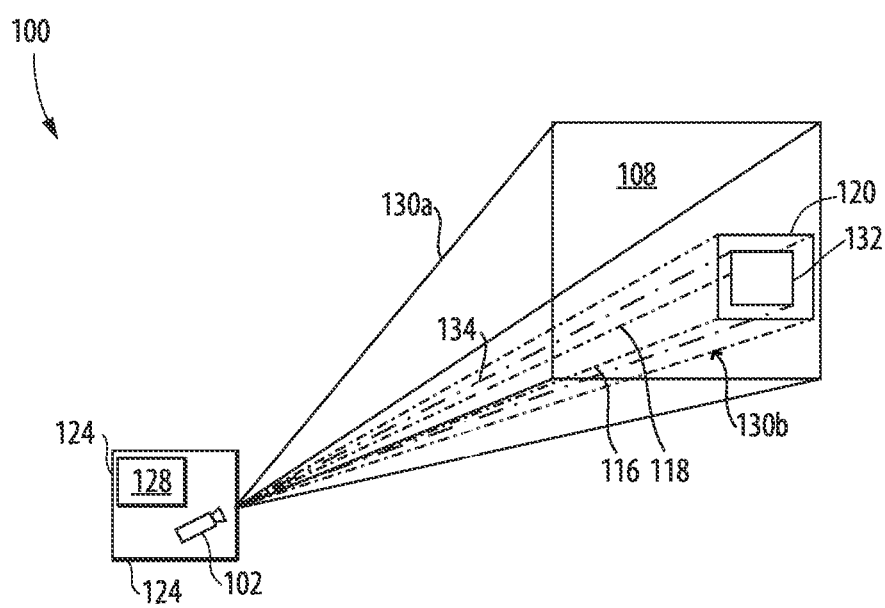
FIG. 2 is a schematic perspective view of the imaging system of FIG. 1 imaging a scene.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described.

Conventionally, laser guided munitions use a laser designator to issue a series of coded pulses of to designate, or "paint" a target. A quad cell located on the munition is configured to detect the coded laser spot reflected from the target. The munition also contains a seeker using the munition electronics and angular displacement of the laser spot to steer the munition to the target. The systems and methods as described herein further include imaging capability, beyond current laser spot tracking technology mentioned above.

Additionally, systems and methods as disclosed herein expand pulse decoding capability to include Pulse Interval Modulation (PIM) decoding, as described herein with reference to system 100. Adding this capability to cameras that utilize SWIR imaging and Pulse Repetition Frequency (PRF) decoding greatly extends the range of lethality for the system 100. Specifically, target acquisition speed, resistance to false targets, and jammer discrimination, are all improved as compared to the conventional quad cell detectors used in laser guided munitions.

The system 100 can be thus be used for imaging while simultaneously detecting, tracking, and decoding multiple coded laser spots. A high resolution (e.g. 1280×1024 pixel) photodetector array (PDA) 102 is included in the system 100, having a plurality of imaging pixels 104 configured to generate electrical signals 106 indicative of an imaged scene 108 and can be sensitive to any suitable wavelengths, for example short-wave infrared (SWIR) wavelengths. An integrated circuit (IC) 110 is operatively connected to the PDA 102 to receive the electrical signals 106 from the imaging pixels 104 to form image data 112. PDA data collection and read out overlap such that there is little dead time during which data is not being captured. In embodiments, the IC 110 can be a read only integrated circuit (ROIC) 110, or can be, or include a field programmable gate array (FPGA) 111 operatively connected to communicate with the IC 110.

In certain embodiments, a laser detector module 114 is included in the IC 110, such that machine readable instructions cause the FPGA 111 to detect one or more Pulse Interval Modulated (PIM) coded laser pulses 116, and/or to detect one or more Pulse Repetition Frequency (PRF) coded laser pulses 118 in the image data 112. PIM coded laser pulses 116 can include a pseudo-random pulse pattern, including modulating the interval between pulses. PRF coded laser pulses 118 include maintaining the interval between each pulse, and modulating only the number of pulses per interval. Once the respective laser pulse(s) 116, 118 is detected, the laser detector module 114 can then correlate position and timing of the one or more PIM and/or PRF coded laser pulses 116, 118 to certain features in the image data, the features being indicative of a designated target 120. While decoding is described herein as being performed by the FPGA 111, separate from a ROIC for example, it is contemplated that decoding may performed in the ROIC (e.g. in IC 110 without a separate FPGA), without departing from the scope of this disclosure.

It is also contemplated that detecting one or more PIM and/or PRF coded laser pulses 116, 118 can include detecting multiple, separate, laser designated targets, each having a distinct PIM and/or PRF code. In such a case, the laser detector module 114 will correlate position and timing of the one or more PIM and/or coded laser pulses 116, 118 to features in the image data 112 to each of the separate targets 120 indicated in the features of the image data 112 as detected. In certain embodiments, an artificial intelligence platform 122 can be operatively connected to the IC 110 to further classify the designated target 120.

A guided munition 124 can include at least one control surface 126 operatively connected to a controller 128. The controller 128 is operatively connected to the IC 110 to guide the guided munition 124 to the classified, designated target 120. For example, once the coded laser pulses 116, 118 have been detected, correlated, and classified as needed or desired, the FPGA 111 can use the PIM and/or PRF code to guide the munition 124 (e.g. via seeker within the munition) to the classified, designated target 120. Further, the controller 128 is configured to dynamically specify an initial region of interest (ROI) 130a in the image data 112 surrounding the designated target 120. Once established, the FPGA 111 will only detect, correlate, and classify coded laser pulses within the ROI 130a, and will ignore any laser pulses outside the ROI 130. Further, a reduced ROI 130b can be specified within the initial ROI 130a to narrow the ROI 130a closer to the target 120 after acquisition of the target 120, if needed. If a reduced ROI 130b is established, laser pulses outside ROI 130b will be ignored, even though they may still be within initial ROI 130a.

In certain situations, the target 120 may possess laser detection equipment 132 to determine whether it is being marked, and to attempt to confuse the seeker by sending a jamming signal 134, for example using a tactical laser jammer. When the tactical laser jammer the receiver detects a laser pulse (e.g. pulses 116, 118), laser diodes are activated to mimic the received signal (e.g. using spoofing pulses 134) to confuse the munition guided by the IC 110. In this case, the IC 110 can be configured to receive the PRF spoofing pulses 136 in the image data 112, differentiate between authentic pulses 116, 118, and to disregard the PRF spoofing pulses 134. At the same time, the ROIC 110 is able to continue to detect and correlate the authentic one or more PIM and/or PRF coded laser pulses 116, 118.

A method for guiding the laser guided munition 124 includes forming an image (synthesized into image data 112) on the PDA 102, receiving electrical signals 106 from the PDA 102 into the IC 110 and FPGA 111, and converting the electrical signals 106 into image data 112. The laser pulse detector 114 in the FPGA 111 detects the one or more coded laser pulses 116, 118 in the image data 112, and correlates the one or more coded laser pulses 116, 118 with one or more features in the image data (e.g. target 120).

If there are multiple targets 120, detecting the one or more coded laser pulses 116, 118 includes detecting multiple separate laser designated targets 120, each having a distinct pulse code. Classifying the designated target 120 using an artificial intelligence platform 122 operatively connected to the IC 110 is performed to guide the laser guided munition 124 to the classified designated target 120 using the laser coded pulses 116, 118 detected by the FPGA 111.

The IC 110 specifies the initial ROI 130a and the reduced ROI 130b in the image data 112 surrounding the designated target 120, and ignores laser pulses outside the ROI 130a, 130b. In addition, the IC 110 can receive spoofing pulses 136 in the image data 112, and disregard the spoofing pulses 136 while continuing to correlate the one or more PIM and/or PRF coded laser pulses 116, 118.

By combining SWIR imaging with PRF and PIM decoding, the systems and methods as described herein provide for a laser guided munition 124 with an imaging system that supports transmission of imaging data in flight so as to improve the effectiveness of a mission. The 1.3 million pixels of the PDA provide superior angular resolution compared to the 4 photo detectors of conventional quad cell detectors, and allows the PRF/PIM decoder to acquire a laser code with as few as 3 pulses from the laser. Furthermore, imaging as provided herein improves lethality by enabling artificial intelligence to compliment the system.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

While the apparatus and methods of the subject disclosure have been shown and described, those skilled in the art will readily appreciate that changes and/or modifications may be made thereto without departing from the scope of the subject disclosure.

What is claimed is:

1. A system comprising:
    a photodetector array (PDA) including a plurality of imaging pixels configured to generate electrical signals indicative of an imaged scene; and
    an integrated circuit (IC) operatively connected to the PDA to receive the electrical signals from the imaging pixels to form image data, wherein the IC includes machine readable instructions configured to cause the IC to:
        detect one or more Pulse Interval Modulated (PIM) coded laser pulses in the image data; and
        correlate position and timing of the one or more PIM coded laser pulses to features in the image data.

2. The system as recited in claim 1, wherein the machine readable instructions are further configured to cause the IC to detect one or more Pulse Repetition Frequency (PRF) coded laser pulses in the image data, in addition to detecting the one or more PIM coded laser pulses.

3. The system as recited in claim 1, wherein detecting one or more PIM coded laser pulses includes detecting multiple separate laser designated targets, each having a distinct PIM code.

4. The system as recited in claim 3, wherein correlating position and timing of the one or more PIM coded laser pulses to features in the image data indicative of a designated target includes correlating each PIM code to a separate target indicated in the features of the image data.

5. The system as recited in claim 1, wherein detecting one or more PIM coded laser pulses includes receiving a pseudo-random pulse pattern.

6. The system as recited in claim 1, wherein the one or more features in the image data are indicative of a designated target.

7. The system as recited in claim 1, wherein the PDA is sensitive to SWIR wavelengths, and wherein the IC is or includes a read out only integrated circuit (ROIC) and/or a field programmable gate array (FPGA).

8. The system as recited in claim 1, further comprising an artificial intelligence platform operatively connected to the IC to classify the designated target and/or determine the PIM code.

9. The system as recited in claim 1, wherein the machine readable instructions are further configured to cause the IC to use the PIM code to guide a munition to the classified designated target.

10. The system as recited in claim 1, further comprising a guided munition with at least one control surface operatively connected to a controller, the controller operatively connected to the IC to guide the guided munition the classified designated target.

11. The system as recited in claim 10, wherein the controller is configured to specify a region of interest (ROI) in the image data surrounding the designated target, and to ignore laser pulses outside the ROI.

12. The system as recited in claim 1, wherein the machine readable instructions are further configured to cause the IC to receive PRF spoofing pulses in the image data and disregard the PRF spoofing pulses while continuing to correlate the one or more PIM coded laser pulses.

13. A method comprising:
   forming an image on a photodetector array (PDA);
   receiving electrical signals from the PDA into an integrated circuit (IC) and converting the electrical signals into image data;
   detecting, with a laser pulse detector operatively connected to the IC, one or more Pulse Interval Modulated (PIM) coded laser pulses in the image data; and
   correlating the one or more PIM coded laser pulses with one or more features in the image data.

14. The method as recited in claim 13, further comprising, detecting, with the laser pulse detector operatively connected to the IC, one or more Pulse Repetition Frequency (PRF) coded laser pulses in the image data, in addition to detecting the one or more PIM coded laser pulses.

15. The method as recited in claim 13, wherein detecting one or more PIM coded laser pulses includes detecting multiple separate laser designated targets, each having a distinct PIM code.

16. The method as recited in claim 13, wherein detecting the one or more PIM coded laser pulses further includes receiving a pseudo-random pulse pattern.

17. The method as recited in claim 13, further comprising classifying the designated target using an artificial intelligence platform operatively connected to the IC.

18. The method as recited in claim 13, guiding a munition to the classified designated target using the PIM code detected by the IC.

19. The method as recited in claim 13, further comprising specifying a region of interest (ROI) in the image data surrounding the designated target, and ignoring laser pulses outside the ROI.

20. The method as recited in claim 13, further comprising, receiving PRF spoofing pulses in the image data, and disregarding the PRF spoofing pulses while continuing to correlate the one or more PIM coded laser pulses.

\* \* \* \* \*